US008390346B2

(12) United States Patent
Condorelli et al.

(10) Patent No.: US 8,390,346 B2
(45) Date of Patent: Mar. 5, 2013

(54) SYSTEM FOR SYNCHRONIZING OPERATION OF A CIRCUIT WITH A CONTROL SIGNAL, AND CORRESPONDING INTEGRATED CIRCUIT

(75) Inventors: Riccardo Condorelli, Tremestieri Etneo (IT); Michele Alessandro Carrano, Catania (IT)

(73) Assignee: STMicroelectronics, SRL, Agrate Brianza (IT)

( * ) Notice: Subject to any disclaimer, the term of this patent is extended or adjusted under 35 U.S.C. 154(b) by 76 days.

(21) Appl. No.: 13/031,008

(22) Filed: Feb. 18, 2011

(65) Prior Publication Data

US 2011/0221498 A1 Sep. 15, 2011

(30) Foreign Application Priority Data

Mar. 15, 2010 (IT) ............ TO2010A000194

(51) Int. Cl.
  *H03L 7/00* (2006.01)
(52) U.S. Cl. ........................ 327/141; 375/357
(58) Field of Classification Search .................. 327/141; 375/354, 357
  See application file for complete search history.

(56) References Cited

U.S. PATENT DOCUMENTS

| 4,873,703 | A | * | 10/1989 | Crandall et al. | 375/371 |
| 5,291,529 | A | * | 3/1994 | Crook et al. | 375/358 |
| 5,602,878 | A | | 2/1997 | Cross | |
| 5,798,661 | A | * | 8/1998 | Runaldue et al. | 327/106 |
| 6,087,867 | A | * | 7/2000 | Holm | 327/144 |
| 6,782,064 | B1 | * | 8/2004 | Schwake | 375/354 |
| 6,956,918 | B2 | * | 10/2005 | Chen et al. | 375/354 |
| 7,027,542 | B1 | | 4/2006 | Shihadeh | |
| 7,352,836 | B1 | * | 4/2008 | Mendenhall | 375/372 |
| 2003/0081708 | A1 | * | 5/2003 | Gelke et al. | 375/354 |
| 2003/0123588 | A1 | * | 7/2003 | Parikh | 375/354 |
| 2009/0009221 | A1 | * | 1/2009 | Edde | 327/156 |

OTHER PUBLICATIONS

International Search Report and Opinion of the International Searching Authority, IT TO20100194, mailed Sep. 28. 2010, 8 pages.
Ludovici, et al., "Comparing Tightly and Loosely Coupled Mesochronous Synchronizers in a NoC Switch Architecture", IEEE, Computer Engineering Lab., Delft University of Technology, The Netherlands May 10, 2009, pp. 244-249.
Dobkin, et al., "Two-phase synchronization with sub-cycle latency", Integration, The VLSI Journal, vol. 42, No. 3, Jun. 1, 2009, pp. 367-375.
Peter Wagener, "Metastability—A Designer's Viewpoint", The Boeing Company, Seattle, WA, Sep. 17, 1990, pp. 14-7.1-14-7.5.
IT Office Action regarding TO2010A000194, Ministero dello Sviluppo Economico, Jan. 19, 2012, 1 page.
European Search Report, EP app. No. 11155057.0-1239, dated May 17, 2011, pp. 1-5.
IT Written Opinion regarding ITTO20100194, Ministero dello Sviluppo Economico, Mar. 15, 2010, pp. 1-5.

(Continued)

*Primary Examiner* — Lincoln Donovan
*Assistant Examiner* — William Hernandez
(74) *Attorney, Agent, or Firm* — Hogan Lovells US LLP

(57) ABSTRACT

A system for synchronizing the operation of a circuit with a control signal includes synchronization flip-flops operating in cascade for receiving a control signal to be synchronized and providing a corresponding control signal synchronized with a clock signal, and a circuit including a finite state machine for receiving the clock signal having state flip-flops for storing the current state of the finite state machine, wherein a last synchronization flip-flop includes one of the state flip-flops.

19 Claims, 4 Drawing Sheets

OTHER PUBLICATIONS

D. Ludovici et al., "Comparing Tightly and Loosely Coupled Mesochronous Synchronizers in a NoC Switch Architecture", Networks-On-Chip, 2009, 3rd ACM/IEEE International Symposium, Piscataway, NJ, USA, May 10, 2009, pp. 244-249, XP031472820.

R. Dobkin et al., "Two-phase synchronization with sub-cycle latency", Integration, The VLSI Journal, North-Holland Publishing Company, Amsterdam, VLSI.2008.11.006, vol. 42, No. 3, Jun. 1, 2009, pp. 367-375, XP026018682.

P. Wagener, "Metastability—A Designer's Viewpoint", IEEE, Sep. 17, 1990, pp. P14/7.1-P14/7.5, XP010093140.

IT Search Report, IT app. No. TO2010194, dated Sep. 28, 2010, pp. 1-3.

* cited by examiner

```
...
case (current_state)
 idle:
   next_state = state_A;
 state_A:
   next_state = state_B;
 state_B:
   if (sync == 1) then
     next_state = state_C;
   else
     next_state = state_B:
 state_C:
   next_state = state_D;
 state_D:
   next_state = state_E;
 state_E:
   next_state = idle;
endcase
...
```

*Fig. 5*

| idle:    | "000" |
|----------|-------|
| state_A: | "100" |
| state_B: | "010" |
| state_C: | "011" |
| state_D: | "101" |
| state_E: | "111" |

*Fig. 6*

```
...
state_F:
  if (sync1 == 1) then
    next_state = state_G;
  else
    next_state = state_F;
...
state_M:
  if (sync2 == 1) then
    next_state = state_N;
  else
    next_state = state_M:
...
```

*Fig. 7*

SYSTEM FOR SYNCHRONIZING OPERATION OF A CIRCUIT WITH A CONTROL SIGNAL, AND CORRESPONDING INTEGRATED CIRCUIT

RELATED APPLICATION

The present application claims priority of Italian Patent Application No. TO2010A000194 filed Mar. 15, 2010, which is incorporated herein in its entirety by this reference.

BACKGROUND OF THE INVENTION

1. Field of the Invention

The present disclosure relates to techniques for synchronizing operation of a circuit with a control signal.

The disclosure has been developed in view of the possible use for optimizing the latency of a synchronization system comprising a plurality of flip-flops.

2. Description of the Relevant Art

Complex electronic systems frequently envisage various hardware subsystems that operate in a concurrent way, each of which has a dedicated timing clock. In general, said clocks may not be correlated to one another; whence the term "concurrent asynchronous systems".

There may, however, arise the need of linking the behaviour of any of these subsystems to the state of any other subsystem, in general of co-ordinating the evolution and the interaction of said processes so as to provide a perfectly predictable global behaviour.

It is thus necessary to tackle the problem of how to convey the information of synchronization from one clock domain to the other preventing said information from being erroneously interpreted. For this reason synchronization protocols are used, for example synchronization protocols of the "VALID" or "VALID/ACK" type, according to whether said communication is of a unidirectional type or of a bidirectional type.

For instance, FIG. 1 shows an example of a unidirectional synchronization, in which a system represented by a finite-state machine (FSM) FSM1 receives a control signal sync through a synchronization circuit 20.

For example, the circuit 20 may comprise a chain of registers (for example, flip-flops), in which the registers are driven with the clock signal CLK1 of the receiving system FSM1. In the example considered, the circuit 20 comprises two flip-flops 20a and 20b connected in series.

FIG. 2 shows, instead, an example of a bidirectional synchronization, in which two systems FSM1 and FSM2 exchange control signals through respective synchronization circuits.

In the example shown, the circuit FSM2 transmits to the circuit FSM1 through a synchronization circuit 20 a control signal VALID. In substantially the same way, the circuit FSM1 transmits to the circuit FSM2 through a synchronization circuit 22 a control signal ACK. This type of communication can be used, for example, to acknowledge proper reception of the signal VALID.

The number of flip-flops can be determined, for example, by the ratio between the operating frequency of the receiving system and the setup time of the particular type of flip-flop used so as to guarantee a complete immunity from the so-called phenomenon of metastability, which is typical in the case of signals that traverse different clock domains.

A "complete synchronization" of the above sort hence guarantees a unique determination of the value of the signal received, which may thus be used by the receiving machine.

SUMMARY OF THE INVENTION

The object of the invention is to reduce as much as possible the latency in the communication between two clock domains.

In fact, the inventors have noted that it is possible to reduce by one the number of flip-flops that must form part of the synchronization chain. In particular, the inventors have noted that it is possible to exploit one of the flip-flops used for encoding the current state of a finite-state machine as synchronization flip-flop, still obtaining a "complete synchronization".

With a view to achieving the aforesaid purpose, the subject of the invention is a system for synchronizing operation of a circuit with a control signal having the characteristics as specified: a system for synchronizing the operation of a circuit with a control signal comprising: a plurality of synchronization flip-flops operating in cascade for receiving as input a control signal to be synchronized and providing as output a corresponding control signal synchronized with a clock signal; and a circuit comprising a finite state machine cadenced with said clock signal having a plurality of state flip-flops for storing the current state of said finite state machine, and having at least one first state, wherein said finite state machine is configured for: remaining in said first state codified with a first bit sequence if said synchronized control signal has a first logic value, proceeding to a second state codified with a second bit sequence if said synchronized control signal has a second logic value, wherein said first bit sequence and said second bit sequence differ by the value of a single bit, and wherein a last synchronization flip-flop comprises a state flip-flop in which is stored said single bit.

The invention also includes a corresponding integrated circuit. Further advantageous characteristics of the invention form the subject of the dependent claims.

The claims form an integral part of the technical disclosure provided herein in relation to the invention.

Various embodiments envisage a sequential circuit, i.e., a finite-state machine, that can be driven with a corresponding clock signal. In particular, said circuit comprises a plurality of state flip-flops for storing a bit sequence that identifies the current state of the finite-state machine, and a combinational circuit that determines the next state of the finite-state machine as a function of the current state and of a control signal.

In various embodiments, the finite-state machine comprises at least one wait state, namely,
  if the control signal has a first logic value, the finite-state machine remains in the wait state; and
  if the control signal has a second logic value, the finite-state machine proceeds to the next state.

For example, such a wait state can be obtained by configuring the combinational circuit that determines the next state in such a way that, when the current state indicates that the finite-state machine is in the wait state (encoded with a first bit sequence), the combinational circuit assigns to the next state:
  the bit sequence of the wait state, if the control signal has the first logic value, or
  the bit sequence of the next state, if the control signal has the second logic value.

In various embodiments, the system also comprises a synchronization circuit that can be driven with the clock signal of the finite-state machine. In particular, said synchronization circuit receives at input a control signal and supplies to the finite-state machine a synchronized control signal.

The inventors have noted in this context that it is possible to exploit one of the flip-flops used for encoding the current state of the finite-state machine as synchronization flip-flop. This makes it possible to reduce the number of flip-flops in the synchronization circuit, thus optimizing the latency of the overall system.

In various embodiments, it is envisaged that the bit sequence of the wait state and the bit sequence of the next state differ for the value of a single bit. This enables determination of the value of said bit directly as a function of the control signal when the finite-state machine is in the wait state.

For example, when the finite-state machine is in the wait state, the combinational circuit can associate directly to said bit the synchronized control signal. Alternatively, if a conversion of the logic levels is required, the combinational circuit can invert the control signal and associate to said bit the inverted control signal.

In general, the system synchronizes the operation of a sequential circuit with a control signal via a plurality of synchronization flip-flops operating in cascade. In particular, the circuit is configured as a finite-state machine that comprises at least one wait state in which a check is made on the logic value of the control signal. According to the solution described here, the bit sequence that identifies the wait state and the bit sequence that identifies the next state differ only for the value of a single bit. In this way, the last synchronization flip-flop can be obtained via the state flip-flop that stores said bit.

In various embodiments, this solution is applied to all the states in which a check is made on the logic value of said synchronized control signal.

In general, the solution can be applied to all state machines in which there is a dependence upon one or more external signals, where, however, said dependence applies for just one signal at a time in a particular state. There may thus be a number of states in which the transaction depends upon external signals, but each time with a single signal in each of the states involved.

The solution described here hence enables use of a synchronization circuit that comprises just one flip-flop, whereas the second synchronization flip-flop is implemented via one of the state flip-flops.

BRIEF DESCRIPTION OF THE DRAWINGS

The invention will now be described purely by way of non-limiting example with reference to the drawing figures, wherein:

FIGS. 5 to 7 show examples of finite-state machines that can be used in the solution described herein.

DETAILED DESCRIPTION

In the ensuing description various specific details aimed to an in-depth understanding of the embodiments are illustrated. The embodiments can be obtained without one or more of the specific details, or with other methods, components, materials etc. In other cases, known structures, materials, or operations are not shown or described in detail so that various aspects of the embodiments will not be obscured.

Reference to "an embodiment" or "one embodiment" in the context of this description indicates that a particular configuration, structure, or characteristic described in relation to the embodiment is comprised in at least one embodiment. Hence, phrases such as "in an embodiment" or "in one embodiment" and the like, that may be present in different parts of this description, do not necessarily all refer to one and the same embodiment. Furthermore, the particular configurations, structures, or characteristics can be combined in any adequate way in one or more embodiments.

The references used herein are only for convenience and do not define the sphere of protection or the scope of the embodiments.

Figure 1:
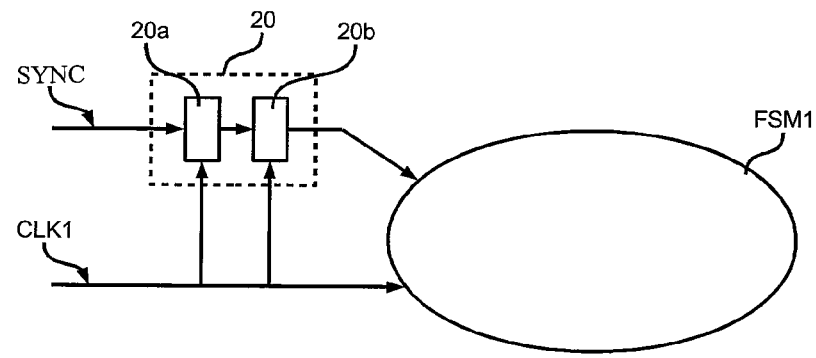
FIG. 1 is an example of undirected synchronization according to the prior art.
Figure 2:
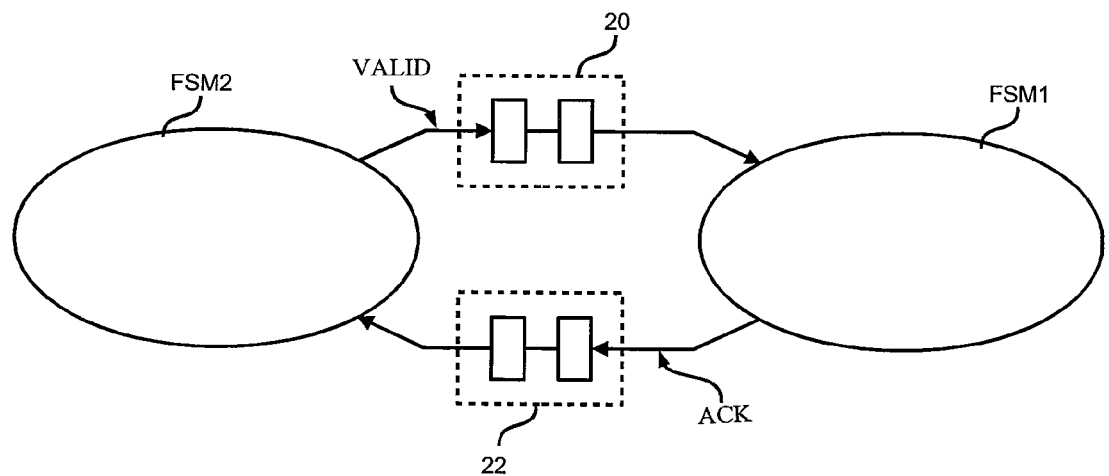
FIG. 2 is an example of undirected synchronization according to the prior art.
Figure 3:
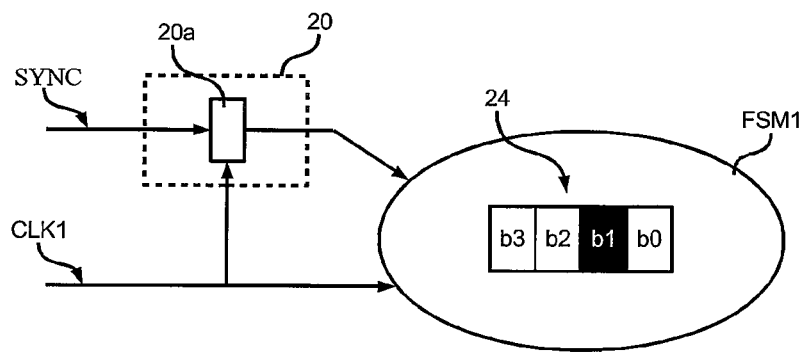
FIGS. 3 and 4 show synchronization systems according to the solution described herein.

FIG. 3 shows an embodiment of a unidirectional-synchronization system in which a finite-state machine FSM1 receives a control signal SYNC through a synchronization circuit 20.

For example, said control signal SYNC can be generated by an asynchronous circuit or a sequential circuit that forms part of a different clock domain.

In the embodiment considered, the circuit 20 comprises a chain of flip-flops, in which the flip-flops are driven with the clock signal CLK1 of the receiving system FSM1.

In the embodiment considered, the state of the finite-state machine FSM1 is stored in a state register 24 comprising a plurality of flip-flops. For example, in the embodiment considered, the state of the finite-state machine FSM1 is encoded with a sequence of four state bits $b3$, $b2$, $b1$ and $b0$.

As has been mentioned previously, the inventors have noted that the last flip-flop of the synchronization chain 20 to be introduced on the control signal can be equated to one of the flip-flops used for encoding the current state of the receiving finite-state machine.

For example, in the embodiment considered, the circuit 20 comprises just one flip-flop 20a, and the function of the second synchronization flip-flop is implemented by a state flip-flop, for example, the flip-flop in which the state bit $b1$ is stored.

Figure 4:
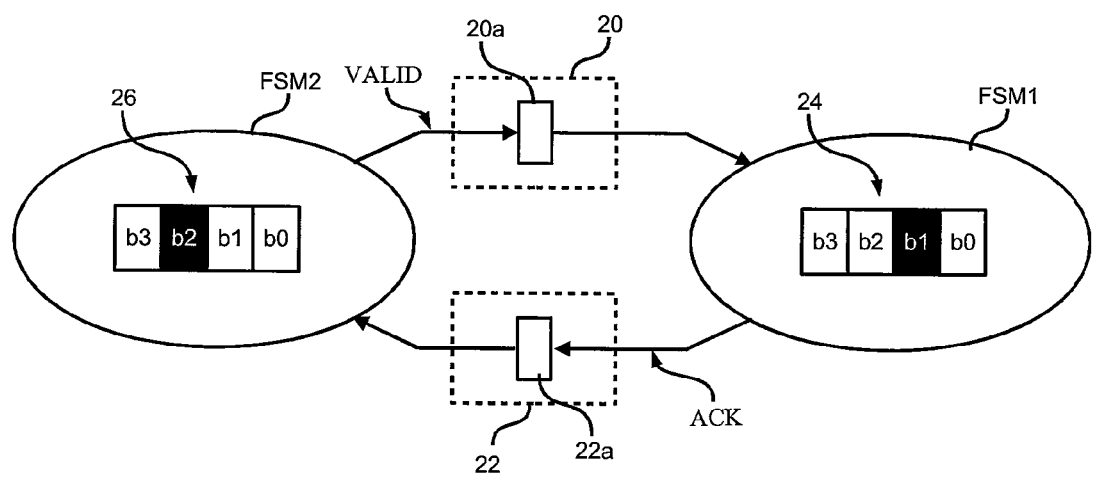

FIG. 4 shows an embodiment of a bidirectional-synchronization architecture in which two systems FSM1 and FSM2 exchange control signals through respective synchronization circuits.

In the example shown, the circuit FSM2 transmits to the circuit FSM1 through a synchronization circuit 20 a control signal VALID. In substantially the same way, the circuit FSM1 transmits to the circuit FSM2 through a synchronization circuit 22 a control signal ACK. This type of communication can be used for acknowledging proper reception of the signal VALID.

In the embodiment considered, the states of the finite-state machines FSM1 and FSM2 are stored in respective state registers 24 and 26 comprising a plurality of flip-flops. For example, in the embodiment considered, the state of the finite-state machine FSM1 is encoded with four bits $b3$, $b2$, $b1$ and $b0$ that are stored in the register 24, and the state of the finite-state machine FSM2 is encoded with four bits $b3$, $b2$, $b1$ and $b0$ that are stored in the register 26.

Also in this case, it is possible to use one of the flip-flops used for encoding the current state of the receiving state machine to implement the function of a synchronization flip-flop.

For example, in the embodiment considered, the circuit 20 comprises just one flip-flop 20a, and the function of the second synchronization flip-flop for the signal VALID is implemented by a state flip-flop of the machine FSM1, for example, the flip-flop of the register 24 in which the state bit $b1$ is stored.

In substantially the same way, the circuit 22 can comprise just one flip-flop 22a, and the function of the second synchronization flip-flop for the signal ACK is implemented by a state flip-flop of the machine FSM2, for example, the flip-flop of the register 24 in which the state bit b2 is stored.

FIG. 5 shows an example of a generic description in a hardware description language (HDL) of a finite-state machine.

The code provided by way of example describes the logic circuit that determines for a machine with six states, idle, state A, state_B, state_C, state_D and state_E, the next state next_state as a function of the current state current_state and of an input signal SYNC.

This machine will behave so as to evolve freely, controlled just by its own clock, in all the states except for a special state, i.e., the state state_B. The state state_B represents a wait state in which the machine may proceed to the state state_C only in the case where the synchronization command SYNC arrives; otherwise, the machine remains in the state state_B.

According to the solution described herein, the code used for these two states (state_B and state_C) is a bit sequence, in which just one bit is different.

FIG. 6 shows a possible encoding for said states by means of three bits b2, b1, and b0.

In the embodiment considered, only the least significant bit b0 changes its value for the state state_B ("010") and the state state_C ("011").

In the embodiment considered, the logic of definition of the new state next_state (i.e., the next state of the finite-state machine) imposes that, when the current state (current_state) is the state state_B, the most significant state bits (b2 and b1) remain unvaried, i.e., that these bits be independent of the value of the synchronization signal SYNC, whereas the state bits b0 may vary from zero to one.

In this case, the logic circuit that implements the determination of the state bits b0 will have the function of a buffer (or an inverter if the logic level is to be inverted). For example, for the code chosen previously and in the case where the command SYNC is active high, the state machine passes from the state state_B to the state state_C only when the signal SYNC has the logic level "1", namely, when the signal SYNC has the logic level "1", the state bit b0 for the next state also assumes the logic level "1", and when the signal SYNC has the logic level "0", the state bit b0 for the next state also assumes the logic level "0".

This means that the logic for the state bit b0 assumes the function of a buffer, and the state bit b0 behaves as the last synchronization stage for the signal SYNC.

Said example can in any case be extended to all the bits of the state code, which can assume the same meaning (of last synchronization stage) for other control signals and in other wait states.

What is important is only that the control signal should be associated in a specific state only to a single state bit to prevent problems of metastability.

In various embodiments, to guarantee that the last synchronization stage is always present, said scheme of association of the bit sequences is applied to all the wait states in which a check is made on the logic value of the control signal itself.

The inventors have noted that this mechanism does not introduce uncertainties in the determination of the new state of the machine, since, if the command is detected, the machine evolves correctly into the new state. Otherwise, the machine remains in the current state waiting for said command.

The advantage achieved with said solution is multiple:

the number of the flip-flops required for synchronization of the control signals (and hence the area dedicated thereto) is reduced;

the latency of the communication between the various systems, i.e., a control device and the controlled finite-state machine, is reduced; and the power dissipated in the synchronization process is reduced, because both the logic for determination of the next state and the number of flip-flops of the synchronization circuit is reduced.

The solution described herein for a simple machine with six states and a single external control signal, can be extended also to more complex machines and with a higher number of external signals that interact therewith. In this case, it is necessary to elaborate, accordingly, the encoding of the states so as to associate different flip-flops to the last stage for synchronization of the incoming signals.

For example, FIG. 7 shows the description of a finite-state machine in which a check is made on two control signals SYNC1 and SYNC2.

In the embodiment considered, the state machine monitors in a state state_F the signal SYNC1, and the machine proceeds to a state state_G only if the signal SYNC1 has the logic value "1".

Also in this case, it is sufficient to associate one bit of the bit sequence used for encoding the states state_F and state_G to the signal SYNC1. For example, the state state_F could be encoded with the bit sequence "0010" and the state state_G could be encoded with the bit sequence "0011". This means that the logic for the next state could associate directly the signal SYNC1 to the least significant bit when the finite-state machine is in the state state_F.

In substantially the same way, in a state state_M the signal SYNC2 is monitored, and the machine proceeds to a state state_N only if the signal SYNC2 has the logic level "1".

Also in this case, it is sufficient to associate one bit of the bit sequence used for encoding the states state_M and state_N to the signal SYNC2. For example, the state state_M could be encoded with the bit sequence "0111", and the state state_N could be encoded with the bit sequence "1111". This means that the logic for the next state could associate the signal SYNC2 directly to the most significant bit when the finite-state machine is in the state state_M.

The synchronization system described herein can hence be designed, for example, via a hardware description language that defines the synchronization circuit 20 and the finite-state machine FSM1. The assignment of the bit sequences to the states may be carried out directly in the source code or may be carried out automatically via a synthesis program.

Of course, without prejudice to the principle of the invention, the details of construction and the embodiments may vary widely with respect to what has been described and illustrated herein purely by way of example, without thereby departing from the scope of the present invention, as defined by the ensuing claims.

We claim:

1. A system for synchronizing the operation of a circuit with a control signal comprising:

a plurality of synchronization flip-flops operating in cascade for receiving as input a control signal to be synchronized and providing as output a corresponding control signal synchronized with a clock signal; and a circuit comprising a finite state machine cadenced with said clock signal having a plurality of state flip-flops for storing the current state of said finite state machine, and having at least one first state, wherein said finite state machine is configured for:

remaining in said first state codified with a first bit sequence if said synchronized control signal has a first logic value, proceeding to a second state codified with a second bit sequence if said synchronized control signal has a second logic value, wherein said first bit sequence and said second bit sequence differ by the value of a single bit, and wherein a last synchronization flip-flop comprises a state flip-flop in which is stored said single bit.

2. The system according to claim 1, wherein said finite state machine comprises a combinational circuit for determining the next state of said finite state machine as a function of said current state and said synchronized control signal.

3. The system according to claim 1, wherein said system comprises two synchronization flip-flops, wherein the first flip-flop comprises a flip-flop external to said finite state machine and the second flip-flop comprises said state flip-flop in which is stored said single bit.

4. The system according to claim 1, wherein said finite state machine is configured for generating a further control signal as a function of said current state of said finite state machine.

5. The system according to claim 1, comprising a further circuit for generating said control signal.

6. The system according to claim 5, wherein said further circuit comprises an asynchronous circuit or a sequential circuit drivable via a second clock signal.

7. The system according to claim 1, wherein said system comprises an integrated circuit.

8. A method for synchronizing the operation of a circuit with a control signal comprising:
   providing a plurality of synchronization flip-flops operating in cascade for receiving as input a control signal to be synchronized and providing as output a corresponding control signal synchronized with a clock signal; and
   providing a circuit comprising a finite state machine cadenced with said clock signal having a plurality of state flip-flops for storing the current state of said finite state machine, and having at least one first state, wherein said finite state machine:
   remains in said first state codified with a first bit sequence if said synchronized control signal has a first logic value,
   proceeds to a second state codified with a second bit sequence if said synchronized control signal has a second logic value, wherein said first bit sequence and said second bit sequence differ by the value of a single bit, and
   wherein a last synchronization flip-flop comprises a state flip-flop in which is stored said single bit.

9. The method according to claim 8, wherein said finite state machine comprises a combinational circuit for determining the next state of said finite state machine as a function of said current state and said synchronized control signal.

10. The method according to claim 8, wherein said system comprises two synchronization flip-flops, wherein the first flip-flop comprises a flip-flop external to said finite state machine and the second flip-flop comprises said state flip-flop in which is stored said single bit.

11. The method according to claim 8, wherein said finite state machine is configured for generating a further control signal as a function of said current state of said finite state machine.

12. The method according to claim 8, comprising a further circuit for generating said control signal.

13. The method according to claim 12, wherein said further circuit comprises an asynchronous circuit or a sequential circuit drivable via a second clock signal.

14. The method according to claim 8, performed on an integrated circuit.

15. A system for synchronizing the operation of a circuit with a control signal comprising:
   a plurality of synchronization flip-flops operating in cascade for receiving a control signal to be synchronized and providing a corresponding control signal synchronized with a clock signal;
   a circuit comprising a finite state machine for receiving said clock signal having a plurality of state flip-flops for storing the current state of said finite state machine, wherein a last synchronization flip-flop comprises one of the plurality of state flip-flops; and
   a further circuit for generating said control signal, wherein said further circuit comprises an asynchronous circuit or a sequential circuit drivable via a second clock signal.

16. The system according to claim 15, wherein said finite state machine comprises a combinational circuit for determining the next state of said finite state machine as a function of said current state and said synchronized control signal.

17. The system according to claim 15, wherein said system comprises two synchronization flip-flops, wherein the first flip-flop comprises a flip-flop external to said finite state machine and the second flip-flop comprises said state flip-flop.

18. The system according to claim 15, wherein said finite state machine generates a further control signal as a function of said current state of said finite state machine.

19. The system according to claim 15, wherein said system comprises an integrated circuit.

* * * * *